Feb. 16, 1971   A. E. BARRINGTON ET AL   3,562,881
FIELD-IONIZATION ELECTRODES
Filed Feb. 27, 1969
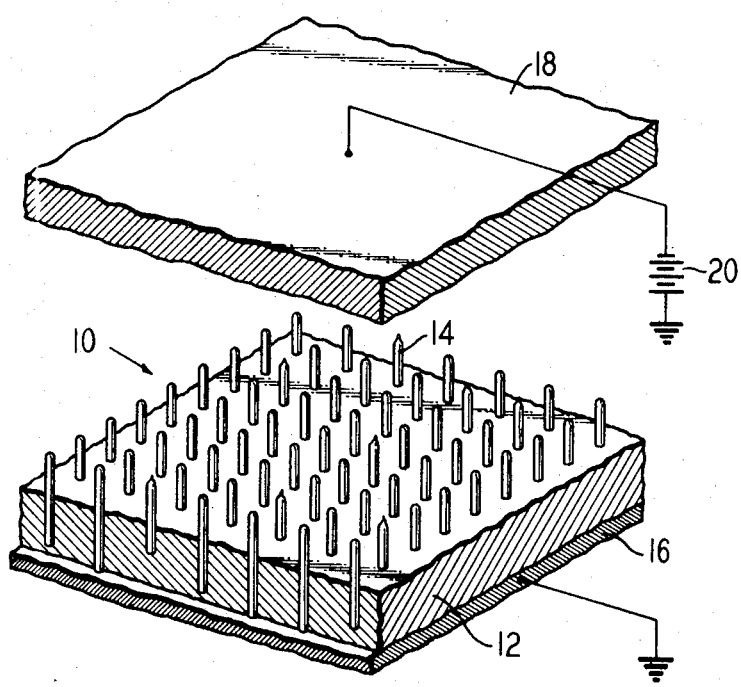
INVENTORS
ALFRED E. BARRINGTON
ARTHUR L. FLORES
WAYNE L. LEES
BY
John R. Manning
ATTORNEYS

# United States Patent Office 3,562,881
Patented Feb. 16, 1971

3,562,881
FIELD-IONIZATION ELECTRODES
Alfred E. Barrington, Lexington, Arthur L. Flores, Bedford, and Wayne L. Lees, Lexington, Mass., assignors to the United States of America as represented by the Administrator of the National Aeronautics and Space Administration
Filed Feb. 27, 1969, Ser. No. 802,972
Int. Cl. H01j 9/16, 9/44
U.S. Cl. 29—25.18                                  5 Claims

ABSTRACT OF THE DISCLOSURE

Field-ionization electrodes comprising an array of microscopically small rods having their lengths and tip configurations equalized. Matching of the electrode elements is accomplished by field evaporation permitted by the high physical strength of the individual rods.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

(1) Field of the invention

The present invention relates to field-ionization electrodes. More particularly, the present invention is directed to the provision of electrodes characterized by an array of microscopically small ionizing surfaces. Accordingly, the general objects of the present invention are to provide novel and improved methods and apparatus of such character.

(2) Description of the prior art

While not limited thereto in its utility, the present invention is particularly well suited for use in field-ionization sources. As is well known, field-ion sources have utility in various environments. For example, such sources may be employed in mass spectrometers.

The desire to improve the efficiency of field-ionization sources has been given impetus in recent years by the need to use these devices in mass spectrometers employed to analyze and/or detect small-concentration constituents in complex gas mixtures, such as the atmospheres of space cabins. Prior-art field-ionization electrodes, from the standpoint of rate of ion production, have been comparatively inefficient devices. That is, prior-art conventional field-ionization electrode assemblies have been characterized by a relatively low ion-forming volume. Consequently, these sources produce ions at an insufficient rate to enable measurement of constituents comprising a small volume fraction of complex gas mixtures.

Prior-art field-ionization electrodes either provided a few individually pointed sharp tips in a cluster, or they depended on the random occurrence of sharp microscopic protrusions over a small area. The individually sharpened tips, which were shaped typically by a chemical or electrolytic etching process, were formed from wires of 10 micron or greater diameter whose ends were tapered to a tip radius of about 0.1 micron. Because of the obvious difficulties of assembly and matching such tips, only small numbers were clustered to form electrodes, and the electrode form most widely employed comprised only a single tip. The ion yield from each tip, at electric fields suitable for mass spectrometry, is very low since it is limited to those gas molecules whose paths, from the surrounding vacuum walls, approach the tip's surface at a distance not exceeding a few times the radius of curvature of the tip. The electrodes employing the randomly shaped and placed tips of sharp protrusions were introduced to increase the number of tips without the exacting labor of tip fabrication. These electrodes either present the naturally occurring sharpest regions of razor-blade edges or of rough-surfaced fine wires, or they carried the more numerous protrusions that may be formed by prolonged exposure of the electrode to high electric fields in suitable vapors. Such tips are not controlled in shape, size or position, and those formed electrically are removed entirely from the electrodes if excessive fields are applied.

The mass spectra of ions from a field ionization source depend on the fields in which ions are formed. For a given molecular species and electrode-surface composition, there is a rough minimum field below which ion currents are too small for practical utility. As the highest field at a tip is increased by increasing the applied potential, new ionic species which are fragments of the neutral molecules appear, and the ions of a given species are spread more widely in energy. The fragmentation, when controllable, is useful for identifying parent molecules; but the wider the range of fields over the various tips of an electrode, the less well can the fragment distribution be associated with a particular ionizing field. Thus, well-matched tips yield spectra more useful for fragment identification than those from random tips.

The potential that must be applied to an electrode to develop a given field at the surface of a tip varies approximately as the radius of curvature at the tip. As the potential of a random assembly of protrusions is raised, therefore, progressively larger tips attain fields high enough to contribute appreciably to ionization. At the same time, the fields at smaller tips increase, their fragmentations vary accordingly, and the energies of their ions vary increasingly because ionization occurs over a wider range of distances from the tip and thus at more widely varying potentials. While major constituents of the gas that is ionized still can be distinguished, because the dominant ion current arises from the large tips, the increasing fragmentation and energy spread from the smaller tips produces a background spectrum that can mask the minor constituents of the gas. Present widely used magnetic mass analyzers are generally incapable of distinguishing energy variations of an ion from variations of its mass. Energy spread, accordingly, reduces mass resolution in the spectrum and can frustrate separation of a minor-constituent mass from the broadened line of a major constituent differing little in mass. For the detection of minor constituents, therefore, a large ionizing area is required in order to form sufficient ions for detection, but the fields over the ionizing regions of this area must be closely matched to permit the separation of trace-constituent ions from those of major constituents. The prior-art electrodes, comprising either a very small number of well matched tips or a large number of randomly shaped tips, have not been suited, therefore, to the identification of trace constituents in complex mixtures.

SUMMARY OF THE INVENTION

The present invention overcomes the above-discussed and other disadvantages of the prior art by providing a field-ionization electrode characterized by an array of microscopically small rods. The tips or ionizing surfaces of these rods are sufficiently small, even when rounded, since the rods are of substantially smaller size than those used for electrodes in the prior art, having radii on the order of 1,000 Angstroms or less. Further, in accordance with the present invention, the lengths and tip configurations of the elements comprising the array of the present electrodes are equalized prior to use of the devices.

3

This equalization is achieved through the performing of a field evaporation treatment step on the electrodes array.

BRIEF DESCRIPTION OF THE DRAWING

The present invention may be better understood and its numerous advantages will become apparent to those skilled in the art by reference to the accompanying drawing which is an isometric view, partly in section, of an embodiment of the present invention.

DESCRIPTION OF THE PREFERRED EMBODIMENT

As noted above, while not limited thereto in its utility, the present invention is particularly well suited for use in high-yield field-ion sources. Thus, for purposes of explanation, the present invention may be considered a macroscopically broad ion source comprising a microscopic array of very numerous points, such points being treated to make all members of the array equally effective in producing ions. The drawing depicts a first embodiment of the present invention prior to the equalization treatment. A study of the drawing will show that certain of the rod-like elements which comprise the array, indicated generally at 10, extend above the supporting matrix 12 a greater distance than others. Also, certain of the rod-like elements, for example rod 14, have irregularities at their tips.

The supporting matrix 12 may be comprised of either a conductive or non-conductive material, the matrix composition being dependent upon the nature of the material from which the matrix and rod-like elements are formed by means of the techniques to be discussed below. In the embodiment shown, the matrix 12 is comprised of a conductive material and is mounted on a conductive plate 16. Each of the rod-like elements, such as rod 14, will necessarily be comprised of a conductive material. In cases where the supporting matrix 12 is non-conductive, the matrix will be sliced or shaved so that all of the rod-like elements in the array will extend completely therethrough and thus will make contact with plate 16.

The rod-like elements, which comprise the array of the embodiment shown, will be metallic whiskers which are obtained by freezing certain alloys from a melt in one direction or by repeated consolidation, elongation to reduce cross-sectional area and rebundling of fibers in a suitable matrix. Mechanical operations that deform a solid plastically, elongating an object with corresponding reduction of cross-sectional area, are widely used in materials fabrication. Swaging, rolling, drawing and extrusion are typical operations that have been used in various combinations to make such shapes as rods, plates, wires, and complicated channels of homogeneous materials and also such composite structures as reactor fuel elements, fiber-optic bundles, and base-metal coins of silver density. The previously cleaned surfaces of the elements of a composite are expanded during plastic elongation, breaking residual oxide films and allowing intimate metallic contact. Thus, properly chosen materials not only deform similarly under the stresses of fabrication but also form intimate bonds at their interfaces. The resulting composite is elongated, reduced in cross-sectional area without change of the fractional areas of its constituents, and bonded into a single mass of initially separate components. If the initial assembly has voids, there will be consolidation with the reduction of volume until these voids are closed. The consolidating operation may, of course, be a separate step if the volume reduction is large. After the elongated, reduced composite has been formed in a given operational sequence, the product can be cut into lengths suitable for the start of the sequence, cleaned, bundled, and again reduced and elongated. Thus, the cycle can be repeated to produce, for example, in a given macroscopic rod, arbitrarily numerous microscopic fibers of chosen shape and area fraction, the fibers being regularly spaced in a matrix of different material. As the fibers become finer, the uniformity of deformation becomes progressively more important since a macroscopically minor local strain may involve microscopically large displacements.

An alternative process, the controlled freezing of a eutectic, leads to a constant area fraction of fibers because a eutectic melt freezes to form two solid phases of different composition without altering the gross liquid composition. Local variations of composition, in the liquid from which one solid phase is freezing, are corrected by diffusion in the liquid to maintain the gross constancy. Thus, the rates of diffusion in the liquid determine the dimensions of the solid phases, and these rates depend on the rate of advance of the liquid-solid interface. If the freezing interface advances uniformly, the dimensions and spacings of the solid phases will be constant and progressively finer fibers of a minor phase can be grown by increasing the rate of freezing. Again, of course, uniformity becomes more important as fibers become smaller, with increasing demand for constancy of temperature distribution, uniformity of rate of interface advance, and stability against mechanical disturbances that could disturb liquid diffusion by superimposing convection. The area fraction of the fiber phase in the cross-section is determined by the unique eutectic composition for the components selected; it is not open to choice. For further information on the production of such whisker composites, reference may be had to an article entitled "Metals With Grown-In Whiskers" by M. Salkind and F. Lemkey which appeared at pages 52–64 of "International Science and Technology," March 1967; to an article entitled "Whisker Composites by Unidirectional Solidification" by M. Salkind et al., which appeared at pages 52–60 of "Chemical Engineering Progress," volume 62, No. 3, March 1966; or to an article entitled "Fabrication of Ultra-fine Columbium-Copper Composite by Drawing," by H. E. Cline et al., which appeared beginning at page 132 of "American Society for Metals, Transactions Quarterly," volume 59, 1966.

As is well known, whiskers are single crystals which have extremely high tensile strength. While whisker growth in metals has been known for some time, techniques such as those discuseed in the above-referenced articles for the production of long, parallel, needle-like whiskers by means of undirectional solidification of eutectic alloys or by means of slow, very uniform, drawing to reduce cross-sectional area of a consolidated composite, are comparatively recent developments. These closely controlled techniques result in arrays of aligned, substantially equally spaced conductors in the matrix. The rod-like conductors may, for example, be chromium or niobium (columbium) in a copper matrix.

Once the composite has been formed by the growing of rod-like elements of one metallic phase in another or by repeated mechanical consolidation and elongation with reduction of area, the bottom surface of the electrode must be shaped so as to enable mating with a supporting structure, such as conductive plate 16. This shaping of the bottom surface of matrix 12 will be accomplished typically by abrasive sawing or electric-spark cutting. Theraffter, the rod-like elements, having radii on the order of 1,000 angstroms must be caused to protrude 10–100 diameters above the surface of the supporting matrix. This is achieved by etching the matrix to the desired depth. For example, when the supporting matrix is copper, the rod-like elements of chromium or niobium may be exposed by etching with nitric acid.

After the electrode array 10 has been formed and mounted on the conductive plate 16, the above-mentioned equalizing treatment will be performed. In accordance with the present invention, it is possible to perform the equalizing treatment either prior or subsequent to the mounting of the electrode assembly in its utilization environment. For purposes of explanation, the array 10 of FIG. 1 is shown positioned in spaced relationship with a conductive plate 18. Plate 18, which could, for example, be replaced by the cathode of a positive-ion source for a mass spectrometer, is connected to the negative terminal of a suitable direct-current source 20. Means will be provided typically for adjusting the potential applied by source 20 to plate 18, and the positive terminal of source 20 will be electrically connected to conductive plate 16.

The application of a sufficient potential between the rod-like elements and the cathode, or plate 18, results in locally excessive fields at the tips of those elements, such as rod 14, which have rough ends or which extend beyond the remaining elements. Accordingly, when the potential difference between the rod-like elements and plate 18 is sufficiently high, field evaporation of element material from the highest-field tips will occur. This evaporation occurs in fields high enough to remove the outermost atoms of the material of the rod-like element as ions, and the rate of evaporation increases rapidly as the field is increased. It is to be noted that the stresses produced in the elements in fields sufficiently high to promote evaporation approach the macroscopic-specimen tensile strength of the elements' material. Thus, prior-art large-area electrodes such as blade edges, having at least one macroscopic dimension exposed to the field stress, would be substantially deformed and probebly broken were equalization by field evaporation to be attempted thereon. Whiskers, however, exhibit a strength approaching that of the perfect lattice, and thus an array of whisker "rods" will tolerate field evaporation without rupture. In actual practice, the tips of the whisker "rods" first round and thereafter regress until the tips of all rods are exposed to equal fields.

The present invention may be distinguished from the prior art by the use of an aggregate of very numerous round tips of very small diameter as compared to previous field-ionization electrodes which employed a smaller number of larger diameter electrodes having sharp tips. The present invention may also be distinguished over the prior art by the ability to use a field-dependent process for the removal of material in an equalization step. It is of particular importance and significance that the present invention achieves matching of all elements of the field-ionization electrode by a single treatment that, by its nature, cannot cause excessive bluntness of these elements. The foregoing results from the fact that the projections, i.e. the needle-like metallic whiskers, are by nature so thin that a rounded tip thereon has a radius sufficiently small to provide the required field concentration without sharpening. The foregoing would not, of course, be true of chemically or electrolytically-etched wires having diameters of 15–20 microns before etching. Similary, the foregoing would not be true generally of random protrusions whose shapes are widely varied; furthermore, the protrusions grown by electric-field "activation" techniques are detached entirely at fields too low to cause appreciable evaporation.

In operation as a positive ion source in the environment of a mass spectrometer, an electrode array in accordance with the present invention is made positive in a gas at a pressure low enough to allow free flight of the ions that form. When the field at each tip is sufficiently high, gas molecules that enter a region very close to the tip are ionized, repelled, and then focused by succeeding electrodes to form a beam that enters a mass spectrometer. The present invention, by virtue of its presenting a large number of ionizing regions in a small area, permits substantial ion yield even from molecular species that are present in small concentration. Also, because of the extremely small size of the individual electrode elements, the ions formed vary little in energy and thus are particularly suitable for energy-sensitive analyzers. The foregoing is a result of the fact that the field at rounded but extremely small-idameter tips decreases rapidly with distance and thus ions may form only in a very narrow region adjacent to the electrode elements.

While a preferred embodiment of the present invention has been shown and described, various modifications may be made thereto without departing from the spirit and scope of the present invention. Accordingly, it is to be understood that the present inventionu has been described by way of illustration and not limitation.

What we claim is:

1. A method of manufacture of a field-ionization electrode comprising:
    forming an array of conductive members in a supporting matrix;
    chemically removing the support matrix to a predetermined depth to expose the conductive members; and
    establishing an electrostatic field between the conductive members and a spacially displaced electrode whereby the conductive members are subjected to a strong field and field evaporation of material from the longer members will occur.

2. The method of claim 1 wherein the step of matching comprises:
    causing the conductive members to become rounded on their outermost extremities and to regress until all are of substantially equal length.

3. The method of claim 1 wherein the step of forming an array of conductive members comprises:
    growing parallel single-crystal whiskers.

4. The method of claim 3 wherein the step of growing comprises:
    unidirectionally solidifying an eutectic alloy.

5. The method of claim 1 wherein the step of forming an array of conductive members comprises:
    mechanical consolidation, reduction in cross-sectional area and elongation of an assembly of suitably spaced rod elements in a supporting matrix material.

References Cited
UNITED STATES PATENTS

| | | | |
|---|---|---|---|
| 2,189,340 | 2/1940 | Donal | 29—25.17X |
| 2,598,317 | 5/1952 | Teal | 29—25.17 |
| 3,195,219 | 7/1965 | Woodcock | 29—25.17X |
| 3,319,318 | 5/1967 | Taimuty | 29—25.17X |
| 3,321,657 | 5/1967 | Granitsas | 29—25.17X |
| 3,453,710 | 7/1969 | Bell | 29—25.11 |

JOHN F. CAMPBELL, Primary Examiner

R. B. LAZARUS, Assistant Examiner

U.S. Cl. X.R.

29—5.17